(12) United States Patent
Hoeck et al.

(10) Patent No.: US 10,923,997 B2
(45) Date of Patent: Feb. 16, 2021

(54) LONG-STATOR LINEAR MOTOR

(71) Applicant: B&R INDUSTRIAL AUTOMATION GMBH, Eggelsberg (AT)

(72) Inventors: Martin Hoeck, Eggelsberg (AT); Alexander Dicker, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/514,189

(22) Filed: Jul. 17, 2019

(65) Prior Publication Data

US 2020/0028427 A1    Jan. 23, 2020

(30) Foreign Application Priority Data

Jul. 18, 2018  (EP) .................................... 18184227

(51) Int. Cl.
  *H02K 41/03*    (2006.01)
  *B65G 35/08*    (2006.01)

(52) U.S. Cl.
  CPC .......... *H02K 41/031* (2013.01); *B65G 35/08* (2013.01)

(58) Field of Classification Search
  CPC ...... H02K 41/031; B65G 35/08; B65G 54/02; B60L 13/03; B60L 13/003; B60L 13/06; E01B 25/32
  See application file for complete search history.

(56) References Cited

U.S. PATENT DOCUMENTS

| | | | |
|---|---|---|---|
| 9,428,347 B2 | 8/2016 | Kleinikkink et al. | |
| 9,802,507 B2 * | 10/2017 | Clark | B60L 15/005 |
| 9,923,444 B2 * | 3/2018 | Kleinikkink | H02K 11/21 |
| 10,532,891 B2 * | 1/2020 | Walter | B60L 13/03 |
| 2013/0074724 A1 | 3/2013 | King et al. | |
| 2015/0027860 A1 | 1/2015 | Klleinikkink et al. | |

(Continued)

FOREIGN PATENT DOCUMENTS

EP    3 109 998    12/2016

OTHER PUBLICATIONS

Europe Search Report/Office Action conduted in counterpart Europe Appln. No. 18184227.9 (dated Jan. 30, 2019) (w/ partial machine translation).

*Primary Examiner* — William R Harp
(74) *Attorney, Agent, or Firm* — Greenblum & Bernstein, P.Lc.

(57) ABSTRACT

Long-stator linear motor with vehicle arranged for movement along transport path. Motor includes holding structure(s) having drive coils, on which passive part of vehicle is arranged; and guide surface and guide track running along path. Passive part has first drive magnet(s) arranged parallel to guide surface with air gap. Vehicle has first profile member(s) arranged on guide track and positioned by pressing force acting in transverse direction onto guide track with respect to an ascending direction running normally to movement direction and transverse direction. First running member(s) support passive part on holding structure against attractive force acting between drive magnets and drive coils to ensure the air gap. Vehicle has first auxiliary guide member(s) which, interacting with an auxiliary guide on holding structure at least in divergence and/or convergence areas of path, delimits movement of vehicle in a positive and/or negative ascending direction at least on one side.

12 Claims, 3 Drawing Sheets

(56) References Cited

U.S. PATENT DOCUMENTS

| | | |
|---|---|---|
| 2015/0360581 A1 | 12/2015 | King et al. |
| 2016/0368718 A1 | 12/2016 | Kleinikkink et al. |
| 2016/0380562 A1 | 12/2016 | Webber et al. |
| 2018/0009333 A1 | 1/2018 | King et al. |
| 2018/0099822 A1 | 4/2018 | Kleinikkink et al. |
| 2018/0323732 A1 | 11/2018 | Webber et al. |
| 2019/0375597 A1* | 12/2019 | Kleinikkink ........... H02K 41/02 |
| 2019/0389675 A1* | 12/2019 | Kleinikkink ........... B65G 54/02 |

* cited by examiner

LONG-STATOR LINEAR MOTOR

CROSS-REFERENCE TO RELATED APPLICATIONS

The present application claims priority under 35 U.S.C. § 119(a) of European Patent Application No. 18184227.9 filed Jul. 18, 2018, the disclosure of which is expressly incorporated by reference herein in its entirety.

BACKGROUND

1. Field of the Invention

The invention relates to a long-stator linear motor having a transport path, along which at least one transport vehicle is movably arranged in the movement direction, wherein the long-stator linear motor comprises at least one holding structure having drive coils, on which a passive part of the transport vehicle is arranged, wherein the long-stator linear motor has a guide surface extending along the transport path, and a guide track extending along the transport path, wherein the passive part comprises at least one first drive magnet which is arranged parallel to the guide surface while leaving an air gap, wherein the transport vehicle has at least one first profile member which is arranged on the guide track and positioned by a pressing force acting in transverse direction onto the guide track with respect to an ascending direction running normally to the movement direction and the transverse direction, and wherein at least one running member supports the passive part on the holding structure against the attractive force acting between the drive magnets and the drive coils in order to ensure the air gap.

2. Discussion of Background Information

Long-stator linear motors of this type are known from the prior art, for example, from U.S. Pat. No. 9,428,347. The advantage of the profile member arranged in the guide track is particularly the simple application because transport vehicles can be added to and removed again from the transport path easily and also without tools. However, it is disadvantageous that the transport vehicles can "derail" if the pressure force is too low or the bearing load is too great, i.e., the profile member moves out of the guide track, wherein the transport vehicle subsequently falls off of the holding structure. It is therefore not possible to equip the transport path with drive coils arranged on both sides because with such an arrangement, which is also called a double comb arrangement, the required pressure force would not be achieved. However, an arrangement on both sides is required especially in the area of switches, particularly if the switches are supposed to be operable without mechanically moved adjusting elements.

SUMMARY

Embodiments of the present invention address the problem of creating a long-stator linear motor, the transport vehicle of which can be added without tools by simply applying the transport vehicle to the holding structure of the transport path, and which is removable simply by lifting the transport vehicle against the magnetic force from the holding structure. However, the long-stator linear motor is supposed to allow for a double comb arrangement of the drive coils and the provision of switches.

According to embodiments, these and further problems are solved by a transport path of the initially described type, in which the transport vehicle has at least one first auxiliary guide member which, by interacting with an auxiliary guide provided on the holding structure at least in divergence and/or convergence areas of the transport path, delimits at least on one side a movement of the transport vehicle in a positive and/or negative ascending direction. As a result, the transport vehicle can also travel through areas of the transport path, in which the pressure force of the profile member would inherently not be sufficient to keep the transport vehicle safely in the track.

In the context of the present disclosure, a "guide track" refers to a form element running along the transport path, which has a negative (i.e., recessed) profile, a positive (i.e., raised) profile, or a combination of negative and positive profile parts. A "profile member" refers to a counterpart which is arranged on the passive part, suitable for and interacting with the guide track, and which can be designed particularly as a profiled sliding element or as a profile roller. The profile member and the guide track are designed such that the force component of the attractive force acting in transverse direction (i.e., along the y-axis) between the drive coils and the drive magnet is deflected into a force acting in the z-direction. This force acting in the z-direction can absorb a force component, which acts in the negative z-direction, of the weight force of the transport vehicle and the goods transported thereon.

Advantageously, the auxiliary guide member can be spaced apart from the auxiliary guide, when the profile member is centered at or in the guide track. As a result, the auxiliary guide does not generate interfering friction in track sections, in which the pressure force is sufficiently high.

In a further advantageous embodiment, the auxiliary guide can be provided only in divergence and/or convergence areas of the transport path. Such divergence and/or convergence areas are required particularly for switches that are adjustable without mechanically moving parts. The features according to the invention are specifically implemented in the path areas, where they are required.

Advantageously, the first running member can be attached to the guide surface. The combination of profile member and running member facilitates the insertion of the transport vehicle and ensures a defined distribution of the pressure force.

In advantageous embodiments, a second running member arranged opposite to the first running member in transverse direction and/or a second auxiliary guide member arranged opposite to the first auxiliary guide member in transverse direction and/or a second profile member arranged opposite to the first profile member in transverse direction and/or a second drive magnet arranged opposite to the first drive magnet in transverse direction can be arranged on the transport vehicle. These features allow the production of holding structures arranged on both sides, wherein the second holding structure can be designed to be either passive (i.e., without drive coils) or active (i.e., with drive coils). The term "opposite in transverse direction" refers to an arrangement on both sides of the x-z-plane (as defined below), regardless of whether the transport vehicle is designed symmetrically or asymmetrically. According to the invention, the symmetrically designed passive part can also be arranged on a holding structure, which is arranged on one side, and used with said holding structure.

In the context of the present disclosure, a "holding structure" generally refers to the entity of stationary parts of the long-stator linear motor. The term thus comprises active elements, particularly the drive coils (or the stator) and their attachment as well as all routing elements, on which the transport vehicles slide along or roll.

In a further advantageous embodiment, the first and/or second profile member, the first and/or second running member and/or the first and/or second auxiliary guide member can be designed independently of one another as a roller, as a sliding element, or as a combination of roller and sliding element. In the embodiment as sliding elements, the respective counteracting attachment areas are designed as sliding guides. Corresponding plain bearings, for example, can be designed as dry or air bearings.

In an advantageous manner, at least one profile member can be designed as a combined sliding/rolling member, the rotational axis of which is arranged centrally in the passive part, wherein the profile member protrudes from both sides of the passive part in the transverse direction. This allows for a very slim design of the passive part. Furthermore, the fact is utilized that the pressure force in the single comb area is very high, wherein the profile member acts as a pure rolling member, and that the pressure force is very low in the double comb areas, wherein the profile member can thus act as a sliding member on both sides.

Optionally, at least one running member can be designed as a combined sliding/rolling member, the rotational axis of which is arranged centrally in the passive part, wherein the running member protrudes from both sides of the passive part in the transverse direction.

The above features can be combined in any manner with the aforementioned features in order to design advantageous long-stator linear motors or transport vehicles. The design of such combinations lies within the ability of a person of average skill in the art.

The invention further relates to a transport vehicle with the features described above for the transport vehicle.

The transport vehicle and the long-stator linear motor are interrelated products that interact with and complement each other.

Other exemplary embodiments and advantages of the present invention may be ascertained by reviewing the present disclosure and the accompanying drawing.

BRIEF DESCRIPTION OF THE DRAWINGS

In the following, the present invention shall be explained in more detail with reference to FIGS. 1 to 5 which show exemplary advantageous embodiments of the invention in a schematic and non-limiting manner. In the drawings.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
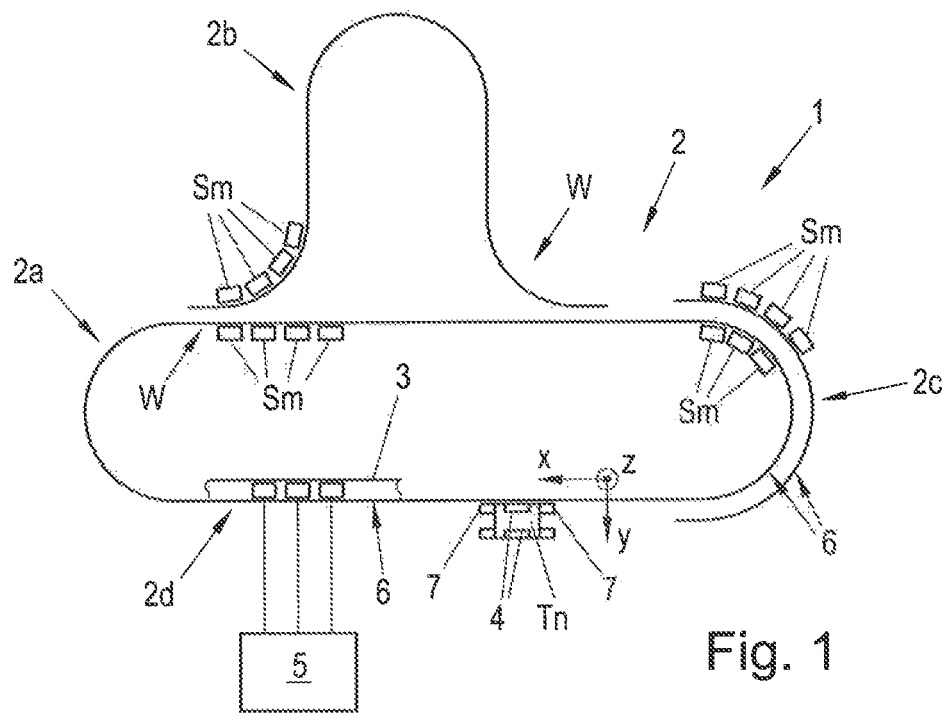
FIG. 1 shows an embodiment of a transport path of a long-stator linear motor.

FIG. 1 shows an exemplary conveying application with a long-stator linear motor 1 with a transport path 2, along which a number of transport vehicles Tn, with $n \geq 1$, can be moved. For the sake of simplicity, FIG. 1 only shows a single transport vehicle Tn, wherein, as a rule, a multiplicity of transport vehicles Tn, frequently several hundred transport vehicles Tn, are moved simultaneously in such an application. The transport path 2 is formed by drive coils Sm (m stands for an index of 1 to number of drive coils) which are arranged next to one another in the movement direction x and are arranged on a stationary holding structure 3 (only indicated in FIG. 1). The drive coils Sm can be controlled by a system control unit 5 (indicated in FIG. 1 only for a few drive coils) in order to energize them and generate a moving magnetic field. On both sides of the transport vehicle Tn (as seen in the transverse direction y), drive magnets 4 are arranged, which interact in a known manner with the magnetic field generated by the drive coils Sm for moving the transport vehicle Tn. For moving a transport vehicle Tn, preferably only the drive coils Sm in the area of the drive magnets 4 of a transport vehicle Tn are energized.

The Cartesian coordinate system x, y, z used is a coordinate system which is moved jointly with the transport vehicle Tn. In this case, x always points in the movement direction of the transport vehicle Tn, which is essentially predetermined by the transport path 2. Of course, at a curved track section, the movement direction is the tangent to the curve. Depending on the design of the transport path 2, the movement direction x can thus basically be oriented in any manner in space. y denotes the transverse direction transversely to the movement direction x and in the direction of the air gap 10 between the drive magnet 4 on the transport vehicle Tn and the drive coils Sm on the transport path 2. z is normal with regard to the x- and y-axis of the transport vehicle Tn and in the context of the present disclosure is called ascending direction z, wherein said term is not meant to be delimiting. As a rule, but not necessarily, the plane of the air gap 10 will be parallel to the x-z-plane, and the y direction will be normal to the plane of the air gap.

Of course, the orientation of the axes of the coordinate system is not limited to the design of the drawings, but instead is arbitrary in principle. For example, a long-stator linear motor 1 could be realized, in which the drive coils Sm and the drive magnets 4 are not arranged on the sides but above and/or below. As a result, the y- and z-axes, for example, would switch places. Optionally, the drive coils Sm and the drive magnets 4 can also be arranged in a plane running obliquely to the x-z-axis, resulting, for example, in a V-shaped configuration in case of a double comb arrangement.

On the transport path 2, at least one switch W is also provided which interconnects a first track section 2a and a second track section 2b which branches off from the first track section 2a. By changing the switch W, it is determined whether the transport vehicle Tn is moved further along the first track section 2a or, essentially in the transverse direction y, is guided onto the second track section 2b and moved along the second track section 2b. In the other movement direction, two track sections are naturally brought together to one track section. As a rule, a switch W can thus be traversed in both movement directions.

Depending on application and need, the transport path 2 can be shaped in any way and can comprise closed and/or open track sections. The transport path 2 also does not have to lie in one plane, for example, the x-y-plane of FIG. 1, but can also be guided anywhere in space.

In order to be able to also use track sections with holding structures 3 arranged on both sides, a vehicle guide element 7 is arranged in the transverse direction y on both sides of the transport vehicle Tn (as seen in the movement direction x). Advantageously, the transport vehicle Tn is constructed symmetrically about the x-z-plane, as shown, for example, in FIG. 2.

On the transport path 2, a track guide element 6 is provided which interacts with a vehicle guide element 7 on the transport vehicle Tn in order to guide the transport vehicle Tn along the transport path 2 in the movement direction x. The track guide element 6 can be arranged on the holding structure 3 or be part of the holding structure 3, but can otherwise also be arranged on the transport path 2. Various elements, such as rollers, wheels, sliding elements, guide surfaces, sliding surfaces, etc., can be provided for guiding. The drive coils Sm are preferably arranged in the area of the track guide element 6, for example, also on the holding structure 3, in order to achieve a compact design.

Figure 2:
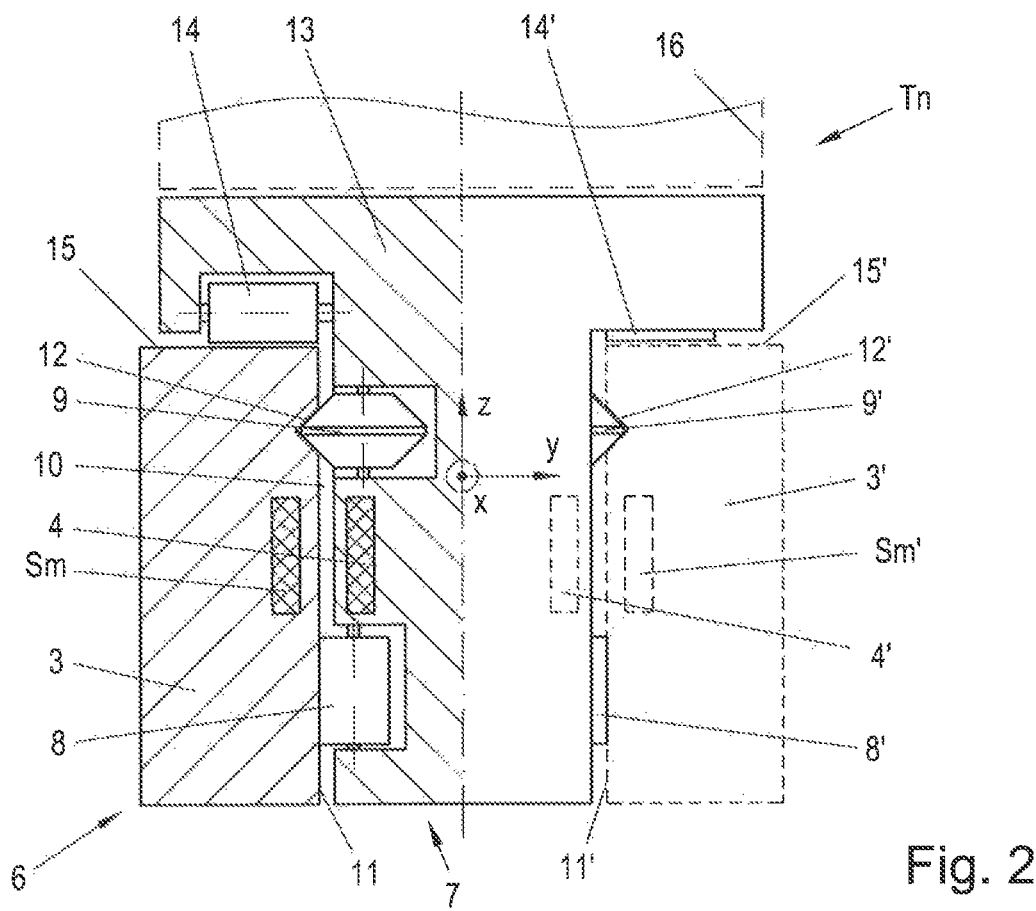
FIG. 2 shows a cross-sectional view of the movement direction of a transport vehicle arranged on a transport path.
Figure 3:
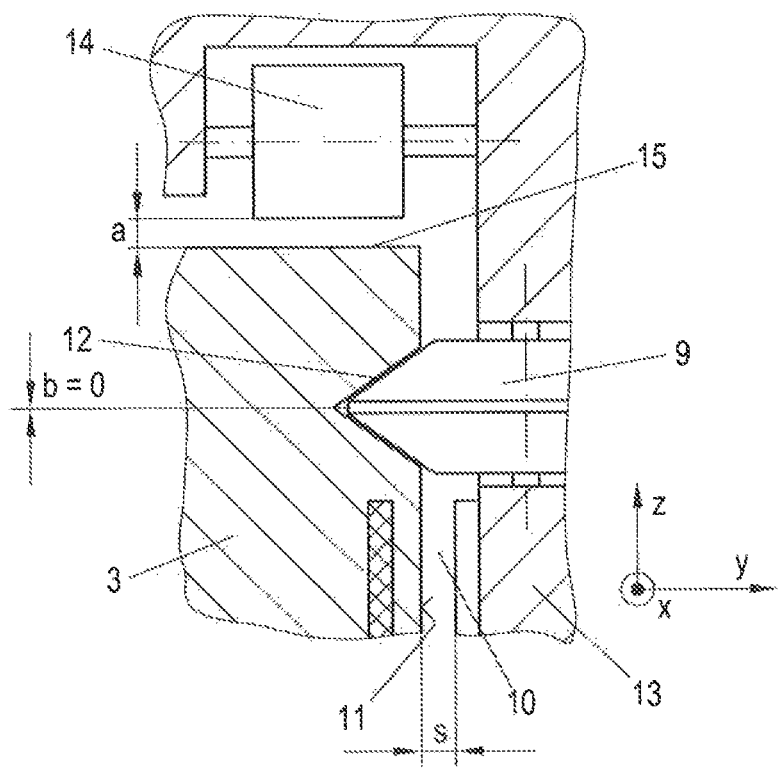
FIGS. 3 and 4 each show a schematic depiction of a profile member and an auxiliary guide member of a transport vehicle arranged on a holding structure in two different positions.

The transport path 2 can be designed on one side or both sides (again as seen in the transverse direction y), as will be explained using FIG. 2. FIGS. 2 and 3 each show a cross-section transversely to the movement direction x (in the y-z-plane) of the transport path 2 and a transport vehicle Tn.

FIG. 2 shows a cross-sectional view of a transport vehicle Tn in the y-z-plane, i.e., transversely to the movement direction x, which is arranged on a holding structure 3. FIG. 2 shows parts of a specific design of the track guide elements 6 and vehicle guide elements 7. In this case, the track guide elements 6 comprise the holding structure 3 and drive coils Sm arranged therein; the vehicle guide elements 7 essentially comprise a passive part 13 of the transport vehicle Tn with the drive magnets 4 arranged thereon and the corresponding guide rollers and/or sliding elements.

The transport vehicle Tn generally consists of the passive part 13, which interacts with the holding structure 3, and a structure 16, which is generally designed for the goods to be transported. The passive part 13 of the transport vehicle Tn is supported on a guide surface 11 of the holding structure 3 by (at least) one running member 8 designed as a wheel or roller in the drawing of FIG. 2 and (at least) one profile member 9 designed as a profile roller in the drawing of FIG. 2, wherein the profile member 9 engages in a guide track 12, whose function will be described in more detail below. In alternative embodiments, the running member 8 can be attached to, and roll off or slide along on, a running member guide which is arranged separately from the guide surface 11 and, for example, specifically provided for said purpose. The guide track 12 can also be designed to be separate from the guide surface. Alternatively, the guide track 12 can also be designed as a raised or positive profile, wherein, in such case, the profile member 9 has a matching negative profile. In an area opposite of the guide surface 11, the transport vehicle Tn is provided with drive magnets 4, wherein the drive coils Sm are arranged on the guide surface 11. In the context of the present disclosure, a passive part 13 thus refers to the area of the transport vehicle Tn, in which the running members 8, profile members 9, and drive magnets 4 are provided, and which is affected by the drive coils Sm (which can thus also be called the active part). Between the guide surface 11 and the surface of the transport vehicle, the air gap 10 is formed, on the sides of which the drive magnets 4 or drive coils Sm are arranged.

At open track sections (i.e., at track sections with a holding structure 3 arranged only on one side), the transport vehicle Tn can be added to or removed from the transport path. In order to be added, the transport vehicle Tn is inserted with the profile member 9 into the guide track 12, wherein the running member 8 becomes attached to the guide surface 11. The magnetic force between drive coil Sm and drive magnet 4 results in a significant pressure force, by means of which the transport vehicle Tn is pressed firmly against the guide surface 11 with the running member 8, and pressed firmly into the guide track 12 with the profile member 9. As a result, the profile member 9 is centered by the pressure force in the guide track 12, and the transport vehicle Tn is guided to a position defined with respect to the z-axis. Simultaneously, the pressure force generates a force component which is oriented normally to the direction of the pressure force, i.e., parallel to the z-axis, and which is strong enough to absorb the weight of the transport vehicle Tn and the goods transported with it.

In the embodiment shown in FIG. 2, the profile member 9 has a wedge-shaped profile, wherein the guide track 12 is designed as a groove with a corresponding V-shaped profile. With its lower profile side (in the drawing of FIG. 2), the profile member 9 rests on the lower guide surface of the guide track 12. The oblique attachment and the normal force thus running obliquely to the pressure force result in a force component oriented in the z-direction, which presses the transport vehicle Tn (again in the drawing of FIG. 2) upward, until the profile member is arranged to be centered in the middle of the guide track 12. The resulting force component is thus dependent on the pressure force and the slope of the profile. It must be strong enough to absorb the dead weight of the transport vehicle Tn and the weight of the goods transported by the transport vehicle Tn. In the other direction (i.e., upwardly), the vertical movement of the profile member 9, and thus of the transport vehicle Tn, is delimited by the (in FIG. 2) upper guide surface of the guide track 12.

However, in addition to the depicted V-profile, any other profile combination of profile member profile and guide track profile can be used, provided that, due to the pressure force, it produces a centering or positioning effect and the corresponding resulting force component. Since the attractive force acting between the drive magnet 4 and the drive coil Sm is generally very strong, relatively large loads can be transported in this manner without requiring additional guides in the z-direction.

The guide also functions in any sloping position, i.e., when the gravity does not act in the direction of the negative z-axis. Practically, the routing can be arranged either in a horizontal plane, but it can also have gradients (ascending and/or descending) or even vertical sections, and/or at least in sections, it can be guided slopingly, or even "upside down" ("upside down" in this context means that the gravity acts in the direction of the positive z-axis).

In the context of the present disclosure, track sections, in which the holding structure 3 is arranged only on one side of the track (or of the passive part 13 of the transport vehicle Tn), are referred to as "single comb areas."

However, it is frequently also desirable or necessary to also arrange a further holding structure 3' on the opposite side of the passive part 13, as is indicated in FIG. 2 with dashed lines. For this purpose, the transport vehicle Tn arranged between the holding structures 3, 3' is designed essentially symmetrically, wherein one set of corresponding running members 8, 8' and profile members 9, 9' is arranged on each side. Optionally, the transport vehicle Tn can also be designed asymmetrically with regard to the passive part 13 and/or the structure 16.

In the context of the present disclosure, track sections, in which the holding structure 3, 3' is provided on both sides (such as the track section 2c or the areas of the switches shown in FIG. 1) are referred to as "double comb areas."

Since opposite drive coils Sm, Sm' are located in double comb regions on both sides of the passive part 13, which act in opposite directions on the drive magnets 4, 4' of the transport vehicle Tn, the resulting transverse force (i.e., the force acting in the transverse direction y) substantially equals zero, and so none of the profile members 9, 9' is pressed into or onto the corresponding guide track 12, 12'. However, due to the guide on both sides in the opposite guide tracks 12, 12', the transport vehicle cannot fall out of the holding structure 3.

However, a problem with the double comb arrangement can arise in the divergence or convergence areas, i.e., in the areas, where the two sides of the holding structure 3, 3' diverge or are brought together, e.g., in case of switches. In those areas, the attractive force between the drive coils Sm arranged on both sides and the corresponding drive magnets 4 acts from both sides on the passive part 13, and so the resulting pressure force, with which the running members 8 and the profile members 9 are pressed against the guide surface 11 (or into the guide track 12), is missing. However, since the two holding structures 3, 3' are already too far away from each other, the "clamping" holder also no longer functions. As a result, a transport vehicle Tn can fall out of the guide in a divergence or convergence area, which then causes a disruption of the transport path 2. This problem occurs more frequently especially with greater transport loads. Higher transport speeds can also increase the problem due to higher centrifugal force components on curved tracks. The effect is independent of an automatic control because it also occurs in the de-energized case and only affects the attractive force between the drive magnets 4 and the iron of the stator.

In order to avoid the occurrence of such disruptions, the transport vehicle Tn, according to the invention, has at least one additional auxiliary guide member 14 which delimits a movement of the transport vehicle Tn in the ascending direction z.

The auxiliary guide member 14 can be designed, for example, as a rolling member, sliding member, or a combined rolling/sliding member, which, at least occasionally, slides or rolls on an auxiliary guide 15 designed, for example, as a guide surface, of the holding structure 3, while delimiting a movement of the transport vehicle Tn in the (positive and/or negative) ascending direction z. The auxiliary guide 15 can either be provided only in divergence or convergence areas of the transport path 2, or it can be provided along the entire transport path 2 on the holding structures 3, 3'. The transport vehicle Tn can be provided with a single auxiliary guide member 14 which, for example, is effective only on one side of the transport path 2, or it can have a plurality of auxiliary guide members 14, which can optionally be arranged on both sides.

In FIG. 2, two guide rollers are provided as auxiliary guide members 14, 14', which are each arranged on one side of the transport vehicle Tn, wherein rolling surfaces are aligned with the auxiliary surface 15 arranged on the holding structure 3. The auxiliary surface 15 is aligned in the x-y-plane, i.e., parallel to the movement direction x and the transverse direction y. In the very simple assumption shown in FIG. 2, the auxiliary surface 15 is aligned normally to the guide surface 11, but this is not a necessary requirement because the auxiliary surface 15 could, for example, also be aligned at an angle to the guide surface 11.

Figure 4:
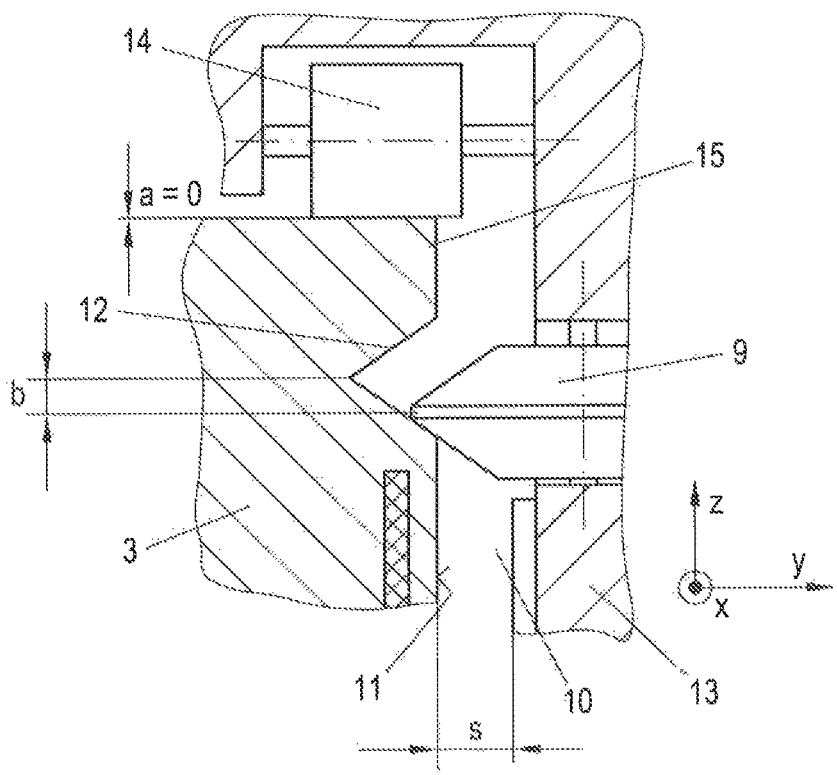

In the properly guided position of the transport vehicle Tn, i.e., if the profile member 9 (or the profile members 9, 9') is arranged precisely fitting in the guide track 12, the auxiliary guide member 14 preferably does not touch the auxiliary guide 15, but instead makes contact with the auxiliary guide 15 only when the profile member 9 has already gone slightly "off the track," as shown schematically in connection with FIGS. 3 and 4. The drawing of FIGS. 3 and 4 essentially corresponds to the concept of the embodiment shown in FIG. 2 of the transport vehicle Tn and the holding structure 3, wherein only a relevant section thereof is shown.

FIG. 3 shows a position, in which the profile member 9 is essentially centered in the guide track 12, i.e., the offset b is zero or (as shown) negligibly small, i.e., within the functionally predetermined tolerances. In this position, the auxiliary guide member 14 is spaced apart from the auxiliary guide 15 and "hovers" in a contact-free manner above the surface of the auxiliary guide 15, thus avoiding friction effects.

For example, in the area of a divergence or convergence of the holding structure 3, 3', the profile member 9 can, for example, move from the centered position due to gravity, as shown in FIG. 4 by the relatively large offset b. In such case, the auxiliary guide member 14 comes in contact with the auxiliary guide 15, thus preventing the profile member 9 to further slide out of the guide track 12.

For the sake of clarity, the drawing of FIGS. 3 and 4 is distorted and not shown to scale. Usually, the maximum distance a is very small, for example, in the range of one millimeter or less. This ensures that the width s of the air gap 10 cannot become too large. Due to the oblique profiling of the guide track 12 and the profile member 9, not only the distance a between the auxiliary guide member 14 and the auxiliary guide 15 changes with the offset b, but also the width s of the air gap 10 between the guide surface 11 and the surface of the passive part 13, and thus also between the drive coil Sm and the drive magnet 4. In order to optimize the effect of the magnetic forces, it is advantageous to keep the width s of the air gap 10 as small as possible.

Optionally, a further auxiliary guide with corresponding auxiliary guide members can be provided in order to delimit the movement of the transport vehicle Tn also in the opposite ascending direction (i.e., descending and ascending). This is particularly meaningful if the transport path does not only run in one plane, but if the path also has chicanes or twists and/or gradients. In practice, this can be done by providing the transport vehicle Tn with a further auxiliary guide member which comes into contact with a second auxiliary guide arranged opposite on the holding structure 3 of the auxiliary guide 15 in the ascending direction z.

In a further alternative embodiment, the holding structure 3 and the auxiliary guide member 14 can be designed such that they are in contact by default and the profile member 9 is thus centered or positioned essentially in a positively guided manner in the guide track 12. In a further embodiment, the auxiliary guide 15 can be provided only in the area of the switches or the divergence or convergence areas of the transport path, for example, in that the holding structure 3 has raised surface or rail areas in these areas, with which the auxiliary guide member 14 comes into contact.

For the design of the passive part 13 of the transport vehicle Tn, numerous further advantageous implementation variations are conceivable. For example, sliding elements for the running members 8 and/or the profile members 9 can also be used instead of the rollers and wheels described above. As a result, the mechanical effort and also the weight of the passive part 13 can be reduced considerably.

In a further variation, one profile member 9 and/or one running member 8 each can be designed as a combined sliding/rolling member, whose axis of rotation is arranged centrally (i.e., in the x-z-plane parallel to the z-axis) in the passive part 13, wherein the profiles or the rolling surfaces protrude from the passive part 13 on both sides. In this case, the profile member 9 and the running member 8 roll off of it in single comb areas, where the rollers are pressed firmly against the guide surface 11 or into the guide track 12, and so the elements act as rollers. However, in double comb areas, where the pressure force is minimal on both sides and the same roller is arranged on each side in a respective guide track 12, 12', it acts on both sides as a sliding element. Such an embodiment allows for a very slim design of the passive part 13 which, for example, can be designed in a simple plate shape. Due to the slim shape, it is also easily possible to connect a plurality of individual transport vehicles arranged one behind the other in an articulated manner, and so they form a "train configuration" which is subsequently moved jointly as a transport unit.

In keeping with the embodiment of the transport vehicles Tn, the holding structures 3 can each have one or more guide tracks 12. In this case, the guide tracks 12 can be arranged symmetrically or asymmetrically, i.e., the guide tracks 12 can be designed similarly or differently on the two sides. Asymmetrical arrangements have the advantage that the alignment of the transport vehicle Tn is clearly defined, whereas symmetrical arrangements offer the advantage that symmetrically designed transport vehicles Tn can be attached to both sides of the holding structure 3 without the operator having to pay attention to the alignment.

Figure 5:
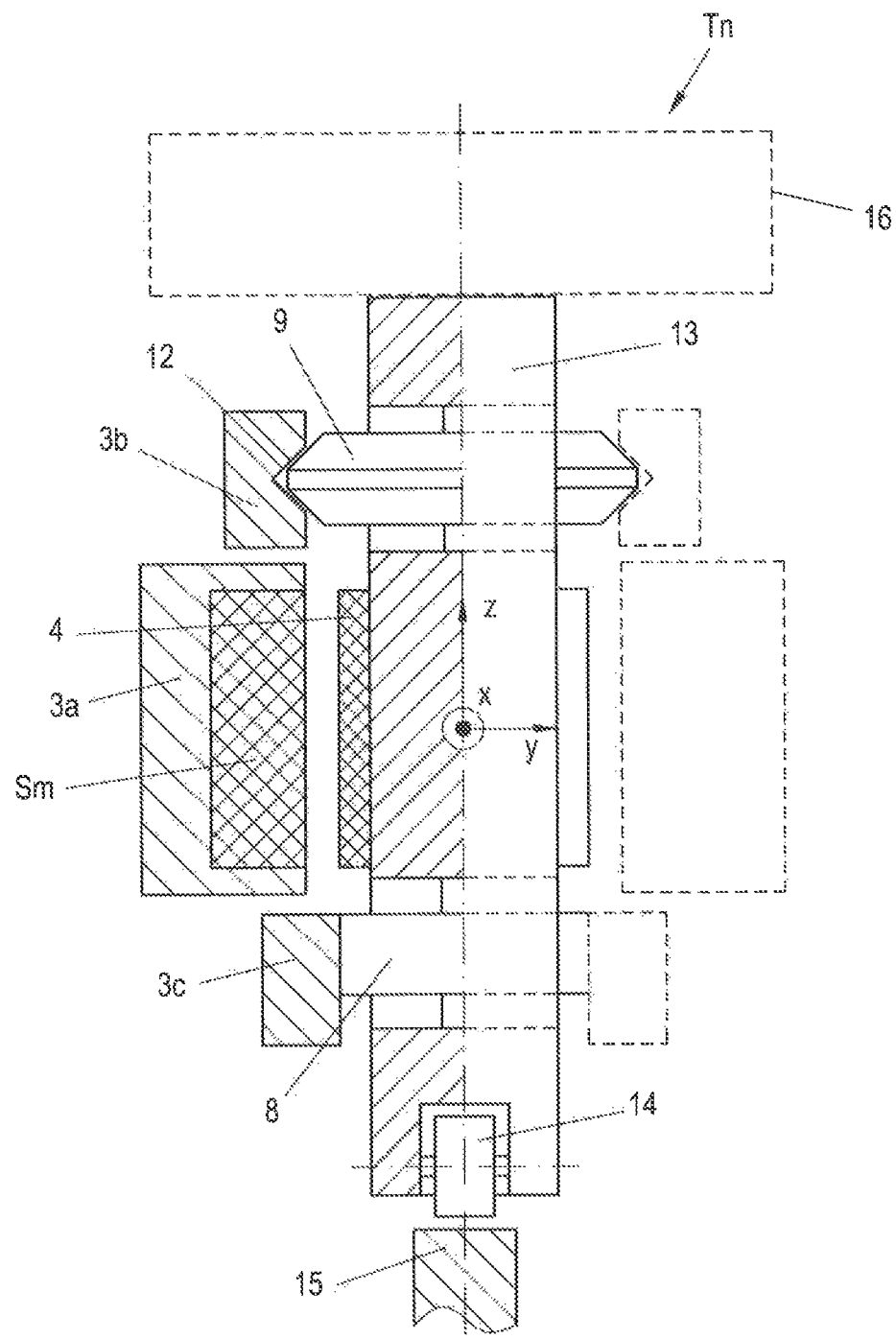
FIG. 5 shows a cross-sectional view of the movement direction of a transport vehicle arranged on a transport path according to a further embodiment.

FIG. 5 shows a transport vehicle Tn according to a further exemplary embodiment, arranged on a long-stator linear motor 1.

The passive part 13 of the transport vehicle Tn shown in FIG. 5 is designed as a relatively slim plate body. The profile member 9 and the running member 8 are designed as combined sliding/rolling members, the axis of rotation of which is arranged centrally (i.e., in the x-z-plane parallel to the z-axis) in the passive part 13, wherein the profile of the profile member 9 and the rolling surface of the running member 8 each protrude from the passive part 13 on both sides. The profile member 9 and the running member 8 are arranged in slots or openings which traverse the passive part 13 in the transverse direction. Permanent magnets are arranged as drive magnets 4 on the side of the plate-shaped passive part 13.

The auxiliary guide member 14 is once again designed as a rolling body with a rotational axis parallel to the transverse axis, wherein in this case only one auxiliary guide member 14 is arranged at the lower end (in FIG. 5) of the passive part in a corresponding seating. In the "normal" position (i.e., when the profile member 9 is centered in the guide track 12), the auxiliary guide member 14 can once again be spaced apart from the auxiliary guide 15, or it can essentially be in constant contact with said auxiliary guide 15.

In contrast to the embodiment of FIG. 2, the holding structure 3 consists in this case of several separate units, which are denoted with 3a, 3b, and 3c. The guide track 12 is provided in a guide rail 3b, and the running member 8 rolls or slides along a guideway 3c. The auxiliary guide 15 is also designed as a separate unit. The part of the holding structure denoted with 3a only includes the drive coils and is otherwise in no direct mechanical contact with the transport vehicle. This design facilitates maintenance and the replacement of worn or defective parts.

The holding structure 3a, 3b, 3c can once again be arranged on one side or on both sides.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE SIGNS

Transport vehicle Tn
Drive coil Sm
Switch W
Movement direction x
Transverse direction y
Ascending direction z
Distance a
Offset b
Air gap s
Long-stator linear motor 1
Transport path 2
Holding structure 3
Drive magnets 4
System control unit 5
Track guide element 6
Vehicle guide element 7
Running member 8
Profile member 9
Air gap 10
Guide surface 11
Guide track 12
Passive part 13
Auxiliary guide member 14
Auxiliary guide 15
Structure 16

What is claimed:

1. A long-stator linear motor having at least one transport vehicle and a transport path, along which the at least one transport vehicle is movably arranged in a movement direction, the long-stator linear motor comprising:
the at least one transport vehicle comprising a passive part;
at least one holding structure having drive coils, on which the passive part of the at least one transport vehicle is arranged,
a guide surface running along the transport path;
a guide track running along the transport path;

the passive part having at least one first drive magnet which is arranged parallel to the guide surface, and an air gap is formed between the guide surface and the at least one drive magnet;

the at least one transport vehicle having at least one first profile member, which is arranged on the guide track and is positioned onto the guide track by a pressing force acting in a transverse direction that is normal to the movement direction and that is normal to an ascending direction also normal to the movement direction;

at least one first running member is arranged to support the passive part on the at least one holding structure against an attractive force acting between the drive magnets and the drive coils, which ensures the air gap;

the guide track being configured so that the pressing force produces a positional adjustment of the at least one transport vehicle in at least one of a positive or a negative ascending direction;

the holding structure having an auxiliary guide in at least one of divergence or convergence areas of the transport path; and the at least one transport vehicle having at least one first auxiliary guide member which, by interacting with the auxiliary guide, delimits movement of at least on one side of the at least one transport vehicle in at least one of the positive or negative ascending direction.

2. The long-stator linear motor according to claim 1, wherein the auxiliary guide member is spaced apart from the auxiliary guide, when the profile member is centered in the guide track.

3. The long-stator linear motor according to claim 1, wherein the first running member is attached to the guide surface.

4. The long-stator linear motor according to claim 3, wherein a second running member is arranged on the at least one transport vehicle, which is arranged opposite the first running member in the transverse direction.

5. The long-stator linear motor according to claim 1, wherein a second auxiliary guide member is arranged on the at least one transport vehicle, which is arranged opposite of the first auxiliary guide member in the transverse direction.

6. The long-stator linear motor according to claim 1, wherein a second profile member is arranged on the at least one transport vehicle, which is arranged opposite of the first profile member in the transverse direction.

7. The long-stator linear motor according to claim 1, wherein a second drive magnet is arranged on the at least one transport vehicle, which is arranged opposite of the first drive magnet in the transverse direction.

8. The long-stator linear motor according to claim 1, wherein a second running member is arranged on the at least one transport vehicle, which is arranged opposite the first running member in the transverse direction, a second auxiliary guide member is arranged on the at least one transport vehicle, which is arranged opposite of the first auxiliary guide member in the transverse direction, and a second profile member is arranged on the at least one transport vehicle, which is arranged opposite of the first profile member in the transverse direction, and wherein at least one of:
   at least one of the first or second profile member,
   at least one of the first or second running member, or
   at least one of the first or second auxiliary guide member are designed as a roller, as a sliding element, or as a combination of roller and sliding element.

9. The long-stator linear motor according to claim 1, wherein the at least one profile member is designed as a combined sliding/rolling member, the rotational axis of which is arranged centrally in the passive part, wherein the profile member protrudes on both sides from the passive part in the transverse direction.

10. The long-stator linear motor according to claim 1, wherein the at least one running member is designed as a combined sliding/rolling member, the rotational axis of which is arranged centrally in the passive part, wherein the running member protrudes on both sides from the passive part in the transverse direction.

11. The long-stator linear motor according to claim 1, wherein the auxiliary guide is provided only in the at least one of divergence or convergence areas of the transport path.

12. A long-stator linear motor having at least one transport vehicle and a transport path, along which the at least one transport vehicle is movably arranged in a movement direction, the long-stator linear motor comprising:

the at least one transport vehicle comprising a passive part;

at least one holding structure having drive coils, on which the passive part of the transport vehicle is arranged, a guide surface running along the transport path;

a guide track running along the transport path;

the passive part having at least one first drive magnet which is arranged parallel to the guide surface, and an air gap is formed between the guide surface and the at least one drive magnet;

the at least one transport vehicle having at least one first profile member, which is arranged on the guide track and is positioned onto the guide track by a pressing force acting in a transverse direction that is normal to the movement direction and that is normal to an ascending direction also normal to the movement direction;

at least one first running member is arranged to support the passive part on the at least one holding structure against an attractive force acting between the drive magnets and the drive coils, which ensures the air gap;

the holding structure having an auxiliary guide in at least one of divergence or convergence areas of the transport path; and the at least one transport vehicle having at least one first auxiliary guide member which, by interacting with the auxiliary guide, delimits movement of at least on one side of the at least one transport vehicle in at least one of a positive or negative ascending direction, wherein the auxiliary guide is provided only in the at least one of divergence or convergence areas of the transport path.

\* \* \* \* \*